United States Patent
Blunk et al.

(10) Patent No.: US 7,452,617 B2
(45) Date of Patent: Nov. 18, 2008

(54) FUEL CELL DIELECTRIC COOLANT AND EVAPORATIVE COOLING PROCESS USING SAME

(75) Inventors: Richard H. Blunk, Macomb Township, Macomb County, MI (US); Mahmoud H. Abd Elhamid, Grosse Pointe Woods, MI (US); Daniel John Lisi, Eastpointe, MI (US); Youssef M. Mikhail, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 965 days.

(21) Appl. No.: 10/737,508

(22) Filed: Dec. 16, 2003

(65) Prior Publication Data

US 2005/0130004 A1 Jun. 16, 2005

(51) Int. Cl.
 *H01M 8/00* (2006.01)
 *H01M 8/04* (2006.01)
 *H01M 8/12* (2006.01)
 *C09K 5/00* (2006.01)
 *C09K 5/04* (2006.01)

(52) U.S. Cl. .............. 429/12; 429/26; 252/67
(58) Field of Classification Search ........... None
See application file for complete search history.

(56) References Cited

U.S. PATENT DOCUMENTS

| | | | |
|---|---|---|---|
| 4,994,331 A | 2/1991 | Cohen | 429/17 |
| 5,064,732 A | 11/1991 | Meyer | 429/13 |
| 5,206,094 A | 4/1993 | Katz | 429/26 |
| 5,534,151 A | 7/1996 | Lee | 210/640 |
| 6,355,368 B1 | 3/2002 | Kralick | 429/26 |
| 6,557,359 B1 | 5/2003 | Wilson et al. | 62/119 |
| 7,138,199 B2 * | 11/2006 | Mohapatra | 429/26 |

FOREIGN PATENT DOCUMENTS

WO 2004027892 A2 4/2004

OTHER PUBLICATIONS

Per Ekdunge and Monika Raberg, "The Fuel Cell Vehicle Analysis of Energy Use, Emissions and Cost", 1998, Int. J. Hydrogen Energy, vol. 23, No. 5, pp. 381-385.*

* cited by examiner

*Primary Examiner*—Patrick Ryan
*Assistant Examiner*—Julian Mercado

(57) ABSTRACT

The present invention is directed to a fuel cell dielectric coolant and evaporative cooling process using same. The coolant comprises an emulsion that defines a polar internal phase and a hydrocarbon external phase. The polar internal phase comprises an azeotropic mixture that includes one or more polar compounds selected from water, alcohol, or combinations thereof. The fuel cell is configured to react fuel with oxygen to generate an electric current and at least one reaction product, and comprises an electrochemical catalytic reaction cell configured to include a fuel flowpath, an oxygen flowpath, and a coolant flowpath fluidly decoupled from the fuel and oxygen flowpaths, and which defines a coolant isolation manifold including the fluid dielectric coolant described above. The method of cooling a fuel cell comprises, inter alia, evaporating the polar internal phase of the fluid dielectric coolant emulsion in the coolant isolation manifold.

7 Claims, 4 Drawing Sheets

FUEL CELL DIELECTRIC COOLANT AND EVAPORATIVE COOLING PROCESS USING SAME

BACKGROUND OF THE INVENTION

The present invention relates generally to liquid cooled fuel cells and, more particularly, to a fuel cell dielectric coolant and evaporative cooling process using the same.

SUMMARY OF THE INVENTION

Fuel cells rely on hydrogen oxidation and oxygen reduction to produce electrical energy. The byproduct of these catalytic reactions is water. Although fuel cells convert chemical energy directly into electrical energy and, thereby, are more thermodynamically efficient than internal combustion engines, irreversibilities caused by large cathodic overpotentials and finite electronic/ionic resistances exist.

Thermodynamically, the oxidation of hydrogen fuel at an anode and the reduction of oxygen at a cathode, both the anode and the cathode located within a fuel cell, should give a cell potential of about 1.23 V. However, the actual measured value is typically around 1 V. This difference in cell voltage is due primarily to the slow kinetics of the cathode, which amounts to an almost 200 mV loss in cell voltage. The result of this loss in cell voltage is an expression of excess heat within the fuel cell. The removal of such excess heat is essential to the prevention of thermal degradation and to increase the useful lifetime of fuel cell components.

As multiple fuel cells are arranged in a stack to increase electrical output, heat generation becomes significantly high. Consequently, in order to remove such excess heat, a coolant is employed that has a high heat capacity (Cp), low viscosity, and which is physically stable at a temperature between about −40° C. and about 140° C. The higher the Cp, the lower the coolant flow rate required to reject the heat and simultaneously maintain a uniform stack temperature needed for effective humidification. This low coolant flow rate together with low viscosity result in low pumping parasitic losses. Aqueous coolants used with conventional combustion engine vehicles fall within this range and typically comprise a mixture of ethylene glycol and water. However, from an electrochemical stability standpoint, the design of today's fuel cell stacks requires that the coolant be non-conducting (dielectric). If the coolant has a significant conductivity, it will lead to a variety of conductive coolant-induced stack problems including shunt currents that reduce fuel efficiency, gas evolution ($O_2$ and $H_2$) in the header area creating increased pressure within the fuel cell stack requiring venting, coolant degradation, and oxygen degradation of stack components including coating blistering and corrosion acceleration.

Known in the art is the use of ion exchange resins with deionized water to rid of impurities in the coolant and maintain its low conductivity. However, the use of deionized water is limited in areas that experience severe winter weather where temperatures can reach −40° C. At this temperature, water freezes and would not be a suitable coolant for the stack. Moreover, ion exchangers increase cost, must be regenerated, and exhibit poor thermal stability above about 80° C.

Also known is the use of a pure dielectric coolant (i.e., Therminol®-D available from Solutia Inc., St. Louis, Mo.). As a pure dielectric, the fluid does not allow current to flow through the header area of the stack. However, the high cost and the low heat capacity as well as the incompatibility of the coolant with gaskets currently employed in fuel cell stacks makes the use of such pure dielectric coolants impractical.

Accordingly, the present inventors have recognized a need for improvements in liquid coolant technology for fuel cell stacks.

The present invention meets the above-mentioned need by providing a fluid dielectric coolant, a fuel cell, a system comprising a fuel cell stack, and a method of cooling a fuel cell that comprises an evaporative cooling process using the fluid dielectric coolant. The fluid dielectric coolant comprises an emulsion defining a polar internal phase dispersed in a hydrocarbon external phase. Although the present invention is not limited to specific advantages or functionality, it is noted that the hydrocarbon external phase, which is electrically resistive, does not allow for any ionic transport. The dielectric coolant effectively "insulates" areas of the fuel cell stack having high electric potential from those of low potential, thereby eliminating any performance loss caused by shunt currents on the header area of the stack, as well as hydrogen and oxygen evolution and plate dissolution. Consequently, corrosion inhibitors need not be added to prohibit $O_2$ degradation of fuel cell components.

The dispersed polar internal phase (e.g., azeotropic water/antifreeze droplets) increases the heat capacity of the fluid dielectric coolant for more efficient removal of waste heat. Accordingly, fuel cell stack temperatures can be maintained more uniformly, which is useful for effective membrane electrode assembly humidification. Further, the present dielectric coolant has a low kinematic viscosity that enables it to be pumped at higher flow rates to remove waste heat without an appreciable increase in parasitic pumping power. The relatively high boiling point of the dielectric coolant enables operating the fuel cell stack and coolant loop at higher temperatures (~140° C.), increasing the capacity to exhaust heat from the radiator to the environment.

The thermal load capability of the fluid dielectric coolant emulsion is further enhanced by employing the cooling process of the instant invention, wherein the polar internal phase droplets are evaporated inside of the fuel cell. The high latent heat of water/antifreeze enables efficient evaporative cooling, as only a small percentage of the polar internal phase need be evaporated in order for effective heat removal. This reduces the occurrence of "dry out" along the plate wall, where heat transfer occurs. Also, the azeotropic composition of the polar internal phase prohibits fractional distillation and freezing of pure water in the fuel cell at low temperature.

In one embodiment, the present invention provides a fluid dielectric coolant comprising an emulsion. The emulsion defines a polar internal phase and a hydrocarbon external phase. The polar internal phase comprises an azeotropic mixture that includes one or more polar compounds selected from water, alcohol, or combinations thereof.

In another embodiment, the present invention provides a fuel cell configured to react fuel with oxygen to generate an electric current and at least one reaction product. The fuel cell comprises an electrochemical catalytic reaction cell configured to include a fuel flowpath, an oxygen flowpath, and a coolant flowpath fluidly decoupled from the fuel flowpath and the oxygen flowpath. The coolant flowpath defines a coolant isolation manifold that includes a fluid dielectric coolant. The fluid dielectric coolant comprises an emulsion, which emulsion defines a polar internal phase and a hydrocarbon external phase. The polar internal phase comprises an azeotropic mixture that includes one or more polar compounds selected from water, alcohol, or combinations thereof.

In still another embodiment, the present invention provides a method of cooling a fuel cell comprising:

a) providing a fuel cell configured to react fuel with oxygen to generate an electric current and at least one reaction product, which can be waste heat;

b) configuring the fuel cell to comprise an electrochemical catalytic reaction cell configured to include a fuel flowpath, an oxygen flowpath, and a coolant flowpath fluidly decoupled from the fuel flowpath and the oxygen flowpath;

c) configuring the coolant flowpath to define a coolant isolation manifold including an inlet, an outlet, and a fluid dielectric coolant comprising an emulsion, the emulsion defining a polar internal phase and a hydrocarbon external phase, wherein the polar internal phase comprises an azeotropic mixture that includes one or more polar compounds selected from water, alcohol, or combinations thereof;

d) providing a recirculation assembly comprising a recirculation flowpath, a pump, and a radiator, and configuring the recirculation assembly so that the recirculation flowpath fluidly connects the coolant isolation manifold inlet and outlet;

e) evaporating the polar internal phase in the coolant isolation manifold, whereby the latent heat of the polar internal phase draws the waste heat from the fuel cell producing a heated polar vapor;

f) circulating the heated vapor from the coolant isolation manifold outlet to the radiator via the recirculation flowpath, whereby the heated vapor is cooled and condensed to form a condensed liquid; and g) re-emulsifying the condensed liquid in the fluid dielectric coolant and returning the fluid dielectric coolant to the coolant isolation manifold inlet.

These and other features and advantages of the invention will be more fully understood from the following detailed description of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention.

DETAILED DESCRIPTION OF SOME EMBODIMENTS OF THE INVENTION

In accordance with one embodiment of the present invention, a fluid dielectric coolant comprising an emulsion is provided, the emulsion defining a polar internal phase and a hydrocarbon external phase. The polar internal phase comprises an azeotropic mixture including one or more polar compounds selected from water, alcohol, or combinations thereof. More particularly, the azeotropic mixture can include water and one or more alcohols, such that the mixture includes a water component and an antifreeze component. Moreover, the azeotropic mixture can further include a non-aqueous coolant comprising one or more alcohols, such as, for example, a ternary acetonitrile/ethanol/trithyl amine system. By "antifreeze", we mean any substance that can be added to a liquid to lower its freezing point. The water can comprise deionized water and the antifreeze component can comprise an alcohol. Typical alcohols for use with the antifreeze component of the present invention include, but are not limited to, ethylene glycol, methanol, ethanol, propylene glycol, acetone, acetonitrile, dichloroethane, triethyl amine, acetal, allyl alcohol, cyclohexane, propanol, propyl acetate, 1,3 propane diol, 2-butanol, and combinations thereof. The emulsion takes advantage of the increased heat capacity of water (4.2 J/g/K) to raise the heat capacity of the fluid dielectric coolant (~2.0 J/g/K), which can be up to and including about 2.8 J/g/K.

The polar internal phase can comprise between about 1 and about 50 percent of the emulsion. If the azeotropic mixture includes a water component and an alcohol component, the water component can comprise up to about 5 to about 40 percent of the polar internal phase, and the alcohol component can comprise up to about 60 to about 95 percent of the polar internal phase. Accordingly, the increase in heat capacity obtained by including the water component can be achieved while still maintaining the non-conductive character and low viscosity of the hydrocarbon external phase, which is described in further detail herein.

Figure 1:
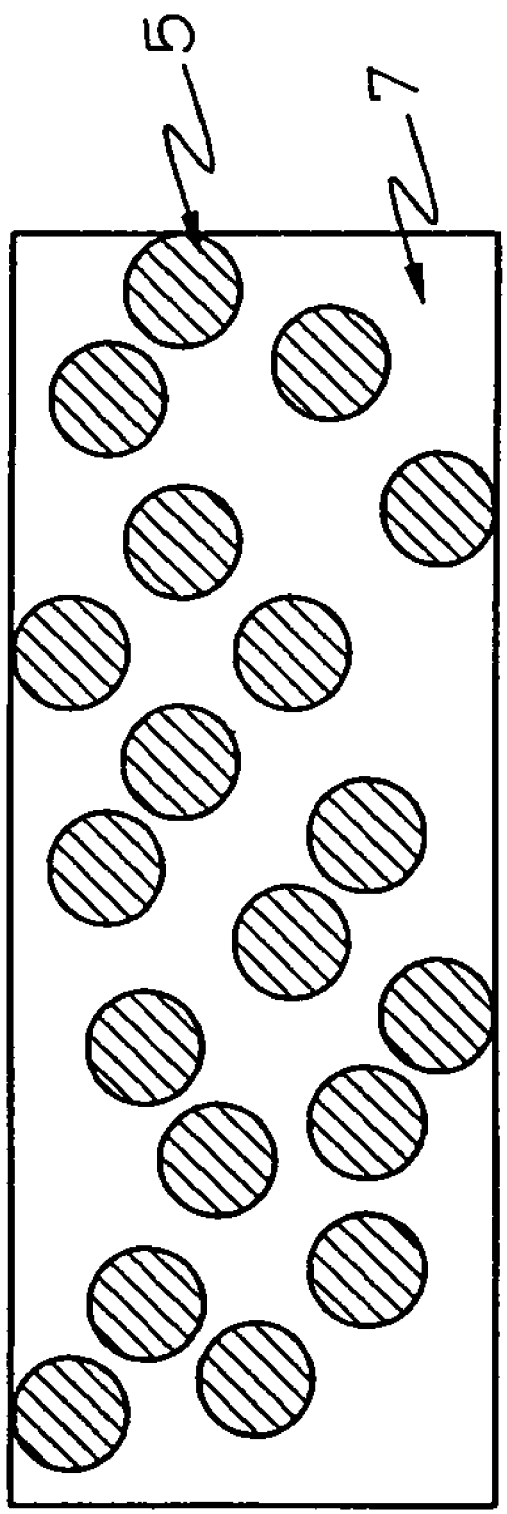
FIG. 1 is a schematic illustration of the fluid dielectric coolant emulsion of the present invention, showing a polar internal phase dispersed in a hydrocarbon external phase.

As further illustrated in FIG. 1, the fluid dielectric coolant emulsion of the present invention can comprise a stable, non-continuous, azeotropic water and antifreeze or non-aqueous composition 5, which is suspended in a continuous hydrocarbon composition 7. The components of an azeotropic mixture (e.g., water/antifreeze) cannot be separated during a phase change (i.e., from liquid to vapor). Thus, the composition of the formed vapor is identical or substantially identical to the same composition in its liquid form. In addition, azeotropic compositions exhibit essentially constant vapor pressure characteristics as the liquid is evaporated. Accordingly, an azeotropic composition is useful as a component of a coolant for fuel cell devices, as described herein with regard to evaporative cooling processes.

In accordance with the instant embodiment, the polar internal phase can comprise a boiling point of greater than or about 60° C., more particularly, between about 60 and about 100° C., and a freezing point of less than or about −35° C., more particularly, between about −35° C. and about −40° C. The polar internal phase can further comprise the following physical characteristics:

| | |
|---|---|
| heat capacity | $\geq$ ~2.5 J/g/K |
| viscosity | $\leq$ ~2 cP at about 80° C. |
| | $\leq$ ~15 cP at about 0° C. |
| thermal conductivity | $\geq$ ~0.4 W/m-K |
| electrical resistivity | $\geq$ ~0.25 Mohm cm |

The hydrocarbon external phase can comprise between about 50 and about 99 percent of the emulsion, and can comprise a kerosenic hydrocarbon. By "kerosenic hydrocarbon" we mean any refined petroleum fraction comprising at least some paraffinic and/or naphthenic hydrocarbons in the $C_{10}$ to $C_{16}$ range. The kerosenic hydrocarbon can be kerosene. Although the kerosenic hydrocarbon comprises a heat capacity of up to and including about 2.5 J/g/K, it has a low kinematic viscosity, which enables it to be pumped at higher flow rates. More specifically, the viscosity of the kerosenic hydrocarbon can be less than or about 10 cP at about 80° C., or less than or about 40 cP at about 0° C. This facilitates the removal of waste heat from a fuel cell without an appreciable increase in parasitic pumping power. The pumping power required to circulate the fluid dielectric coolant can be reduced by using bipolar plates possessing additional open coolant flowpaths.

The freezing point of the kerosenic hydrocarbon of the present invention can be less than or about −35° C. More particularly, the freezing point of the kerosenic hydrocarbon can be between about −40 and about 0° C. Consequently, the kerosenic hydrocarbon can be employed in cold environments without a risk of coolant failure due to freezing. On the other end of the temperature spectrum, the boiling point of the kerosenic hydrocarbon of the present invention can be greater than or about 85° C. More particularly, the boiling point of the kerosenic hydrocarbon can be between about 175° C. and about 325° C. In addition, the kerosenic hydrocarbon has a flash point between about 37.7° C. and about 65.5° C., and can auto ignite at about 444° F. (228° C.). The thermal conductivity of the kerosenic hydrocarbon can be up to and including about 0.15 W/m-K or, more particularly, between about 0.05 and about 0.4 W/m-K. The electrical resistivity of the kerosenic hydrocarbon of the present invention can be greater than or about 18 Mohm cm. More particularly, the electrical resistivity of the kerosenic hydrocarbon can be between about 0.25 and about 40 Mohm cm.

The use of the kerosenic hydrocarbon as a component of the coolant can extend the useful life of the fuel cell, as unlike aqueous-based coolants, kerosenic hydrocarbons such as kerosene will not degrade the stack components. Consequently, corrosion inhibitors need not be added to the fluid dielectric coolant of the instant invention.

In accordance with another embodiment of the present invention, a fuel cell is provided that is configured to react fuel (typically, gaseous hydrogen) with oxygen to generate an electric current and at least one reaction product. Among the other components of the fuel cell that will be described in further detail below, the fuel cell comprises a coolant flowpath that defines a coolant isolation manifold. The manifold includes a fluid dielectric coolant comprising the emulsion described in the first embodiment of the invention above, which is employed to cool the fuel cell and increase the useful lifetime of its components.

In accordance with still another embodiment of the present invention, a system is provided comprising a fuel cell stack comprising a plurality of fuel cells. Each fuel cell within the stack is configured to react fuel with oxygen to generate an electric current and at least one reaction product. Included in the stack is a coolant flowpath, which defines a coolant isolation manifold. The manifold includes a fluid dielectric coolant that comprises an emulsion defining a polar internal phase and a hydrocarbon external phase, as is described in the first embodiment of the invention above.

The conductivity of the fluid dielectric coolant is considerably important when choosing a coolant for fuel cell stacks. This is primarily because of the stack design that employs a header area to distribute the reactive gasses as well as the coolant to the coolant flowpath. In this header area, an electric field of 5 to 10 V/cm is easily attained. Ionic contamination of aqueous coolants can increase the conductivity to unacceptable levels causing shunt currents in the header area.

However, the fluid dielectric coolant emulsion of the present invention is a dielectric, which does not permit ionic transport. Consequently, even when contaminated, the coolant emulsion does not affect the stack components and also does not allow for performance loss due to shunt current on the header area of the stack. And unlike the ion exchange resins of the prior art that thermally degrade prematurely at temperatures exceeding 80° C., the present fluid dielectric coolant emulsion can operate without an ion exchanger at much greater temperatures in order to efficiently exhaust waste heat at the radiator.

The fuel cell and system of the present invention each further comprise an electrochemical catalytic reaction cell configured to include a fuel flowpath, an oxygen flowpath, and a coolant flowpath fluidly decoupled from the fuel flowpath and the oxygen flowpath. The fuel flowpath can comprise an anode flowpath configured to route fuel through at least a portion of each fuel cell. The electrochemical catalytic reaction cell can further comprise an anode in fluid communication with the anode flowpath, upon which a catalytic reaction with the fuel is configured to take place. In addition, the oxygen flowpath can comprise a cathode flowpath configured to route oxygen through at least a portion of each fuel cell. The electrochemical catalytic reaction cell can further comprise a cathode in fluid communication with the cathode flowpath and a catalytic reaction with the oxygen is configured to take place on the cathode. Moreover, a membrane can be disposed between the anode and the cathode such that electrolyte communication is established therebetween during operation of the fuel cell or system.

The fuel cell and system of the present invention, each comprising a coolant flowpath, can each further comprise a recirculation assembly comprising a recirculation flowpath, a pump, and a radiator. The coolant isolation manifold can further include an intlet and an outlet. The recirculation flowpath extends from the coolant isolation manifold inlet and fluidly connects the pump and radiator to the coolant isolation manifold outlet. The recirculation assembly is configured to circulate coolant throughout the coolant flowpath, thus drawing waste heat from the fuel cell or fuel cell stack and delivering it via the recirculation flowpath to the radiator. The radiator can be any radiator that is effective in removing heat from the heated dielectric coolant for recirculation back to the coolant isolation manifold.

Figure 2:
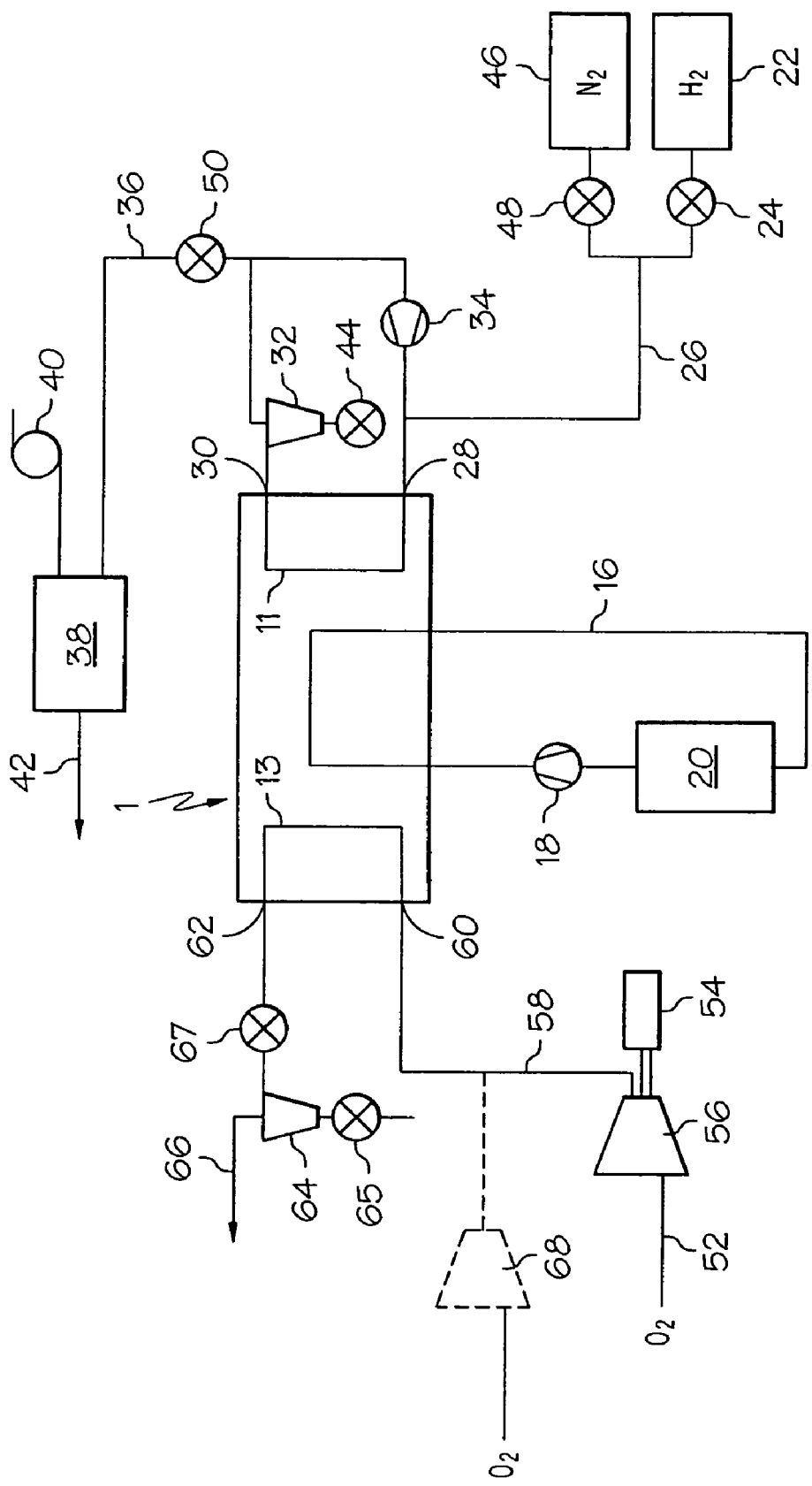
FIG. 2 is a schematic illustration of a system comprising a fuel cell stack in accordance with the present invention.

While not intending to limit the present invention to any particular fuel cell structure, referring now to FIG. 2, a schematic illustration of a typical fuel cell or fuel cell system for use in accordance with the present invention is provided as an example. Fuel cell stack 1 includes a plurality of individual fuel cells that can be electrically connected in series, in parallel, or a combination of both. At the fuel side 11 of the fuel cell stack 1, fuel (typically, gaseous hydrogen $H_2$) can be fed from a supply 22 via a valve 24 and line 26 into the electrochemical catalytic reaction cell via the fuel flowpath, which is positioned within the fuel cell. The fuel therefore enters the fuel cell stack 1 at the inlet 28, while fuel exhaust gasses containing unconsumed hydrogen and water exit the fuel cell stack 1 at the outlet 30. The water that condenses out can be received in a collection receptacle 32, while a portion of the exiting hydrogen can be returned to the inlet 28 by means of a pump 34. The remaining fuel side exhaust gasses can be fed via a valve 50 and line 36 to a combustor device 38, where together with air from a fan 40, the fuel side exhaust gasses are burned such that the combustion of exhaust gasses, primarily nitrogen and water vapor, leave the fuel cell stack 1 via line 42. The water that has collected in the receptacle 32 can be drained periodically by means of a drain valve 44.

At the fuel side 11 of the fuel cell stack 1 there can also be a supply of nitrogen $N_2$ in a reservoir 46. When the fuel cell stack 1 is off, valve 24 can be closed and valve 48 can be opened in order to introduce nitrogen $N_2$ via line 26 into the fuel flowpath in the fuel cell in order to displace the hydrogen $H_2$ from the fuel cell. The hydrogen $H_2$ can then be burned under controlled conditions in the combustor 38, thereby reducing the danger of hydrogen $H_2$ accumulation in the fuel cell. The combustion device 38 need not be continuously in operation and can be isolated from the fuel side 11 circuit by means of the valve 50.

Oxygen $O_2$ enters the oxygen side 13 of the fuel cell stack 1 via line 52, and can be compressed by a compressor 56 that is driven by a motor 54. After passing through compressor 56, the oxygen $O_2$ passes through line 58 to the cathode inlet 60, where it enters the electrochemical catalytic reaction cell within the fuel cell via the oxygen flowpath. The exhaust gas, which primarily consists of water vapor, nitrogen and oxygen, exits from the oxygen outlet 62 of the fuel cell stack 1, where water vapor can be collected in a receptacle 64, while the remaining exhaust gasses are vented to the atmosphere via line 66 and valve 67. An optional auxiliary compressor 68, which is also driven by a motor (not shown), or compressor 56 can be used to start up the system. As with the fuel side 11 of the system, a valve 65 can be used to selectively allow water collected in receptacle 64 to be drained from the system.

In accordance with the present invention, the recirculation assembly 16 is represented as a loop to ensure adequate cooling of the fuel cell stack 1 during system operation. The assembly 16 is autonomous relative to the fuel side 11 and the oxygen side 13 such that the dielectric coolant (an emulsion defining a polar internal phase and a hydrocarbon external phase) in the assembly 16 does not mix with the fluid generated by the reaction between the hydrogen $H_2$ and oxygen $O_2$ within the reaction cell. The assembly 16 further includes a closed recirculation flowpath with a pump 18 and a radiator 20.

Figure 3:
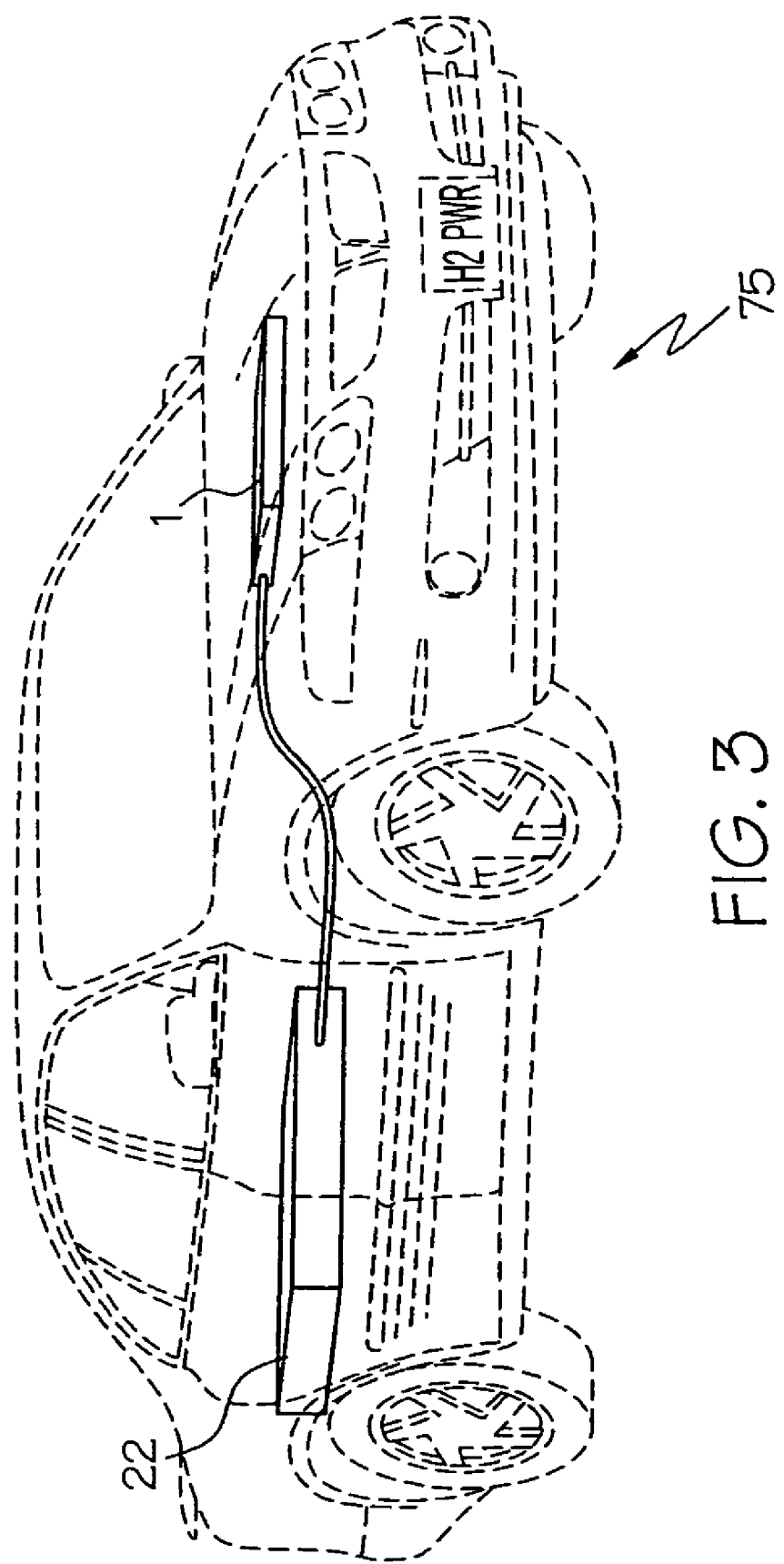
FIG. 3 is a schematic illustration of a system further comprising a vehicle body in accordance with the present invention.

Referring now to FIG. 3, the system of the present invention can further comprise a vehicle body 75. The fuel cell stack 1, which can be embodied within the vehicle body 75, is configured to at least partially provide the vehicle body 75 with motive power. A supply 22 of fuel can be provided, which is typically gaseous hydrogen. Although the vehicle shown in FIG. 3 is a passenger automobile, it is contemplated that the vehicle can be any vehicle now known or later developed that is capable of being powered or propelled by a fuel cell system, such as, for example, automobiles (i.e., car, light- or heavy-duty truck, or tractor trailer), farm equipment, aircraft, watercraft, railroad engines, etc. The system shown in FIG. 3 can be cooled by the fluid dielectric coolant emulsion described herein, having properties that are effective in reducing the occurrence of shunt current within the fuel cell stack 1.

In accordance with yet another embodiment of the present invention, a method of cooling a fuel cell or fuel cell system is provided comprising providing a fuel cell or fuel cell stack that is configured as hereinbefore described and evaporating the polar internal phase of the fluid dielectric coolant emulsion in the coolant isolation manifold, whereby the latent heat of the polar internal phase draws waste heat from the fuel cell producing a heated vapor. This reduces the internal temperature of the electrochemical catalytic reaction cell, which typically comprises an operating temperature of between about 80 and about 90° C.

The polar internal phase can be evaporated by boiling it in the coolant isolation manifold at a substantially constant temperature (i.e., the boiling point of the polar internal phase) and pressure (i.e., about 1 atmosphere). Only a portion of the polar internal phase need be evaporated in the coolant isolation manifold in order to affect cooling of the fuel cell, such as, for example, a portion that is less than about 5% of the polar internal phase. This significantly reduces the occurrence of "dry out" in the fuel cell, wherein large vapor bubbles of low thermal conductivity form next to the plate wall causing exponential increases in plate temperature.

The method further comprises circulating the heated vapor from the coolant isolation manifold outlet to the radiator via the recirculation flowpath, whereby the heated vapor is cooled and condensed to form a condensed liquid, re-emulsifying the condensed liquid in the fluid dielectric coolant, and returning the fluid dielectric coolant to the coolant isolation manifold inlet.

In accordance with the instant embodiment, by employing evaporative cooling (two-phase boiling) in the coolant isolation manifold, the method enhances the thermal load characteristics of the fluid dielectric coolant emulsion by allowing a portion of the non-continuous, polar internal phase to boil off. Accordingly, a significant amount of heat can be dissipated away from the electrochemical catalytic reaction cell with no or little coolant temperature increase due to the large latent heat of vaporization of the polar compound(s).

Moreover, in order to prevent fractional distillation and freezing of the polar internal phase at low temperature (i.e., about −37° C. freezing point specification), wherein the water/antifreeze droplets would eventually vaporize and condense into pure water and pure antifreeze droplets during repeated evaporation and condensing, the polar internal phase is configured so that it is at or near its azeotropic composition. By "azeotropic", we mean a constant-boiling composition, or that the vapor boiling from a liquid has the same composition as the liquid (i.e., vapor composition equals liquid composition). If the polar internal phase is at or near its azeotropic composition, it should be at a composition that fractionates as an azeotropic mix and as a pure antifreeze. Otherwise, the pure water droplets would freeze at low temperature upon distillation. Thus, a low freezing point aqueous internal phase at its azeotropic composition is typical (e.g., 2-butanol/water, water/ethanol, water/propanol/propyl acetate, etc.). Fractional distillation should not occur because the vapor phase composition is identical to the liquid phase composition. In addition, boiling occurs at constant temperature, assuming pressure remains constant. However, for cases where the azeotropic composition is difficult to stabilize, it is best to employ a composition wherein the distilled droplets consist of the azeotropic composition and pure antifreeze, not pure water, which will freeze.

In order that the invention may be more readily understood, reference is made to the following example, which is intended to illustrate the invention, but not limit the scope thereof.

Figure 4:
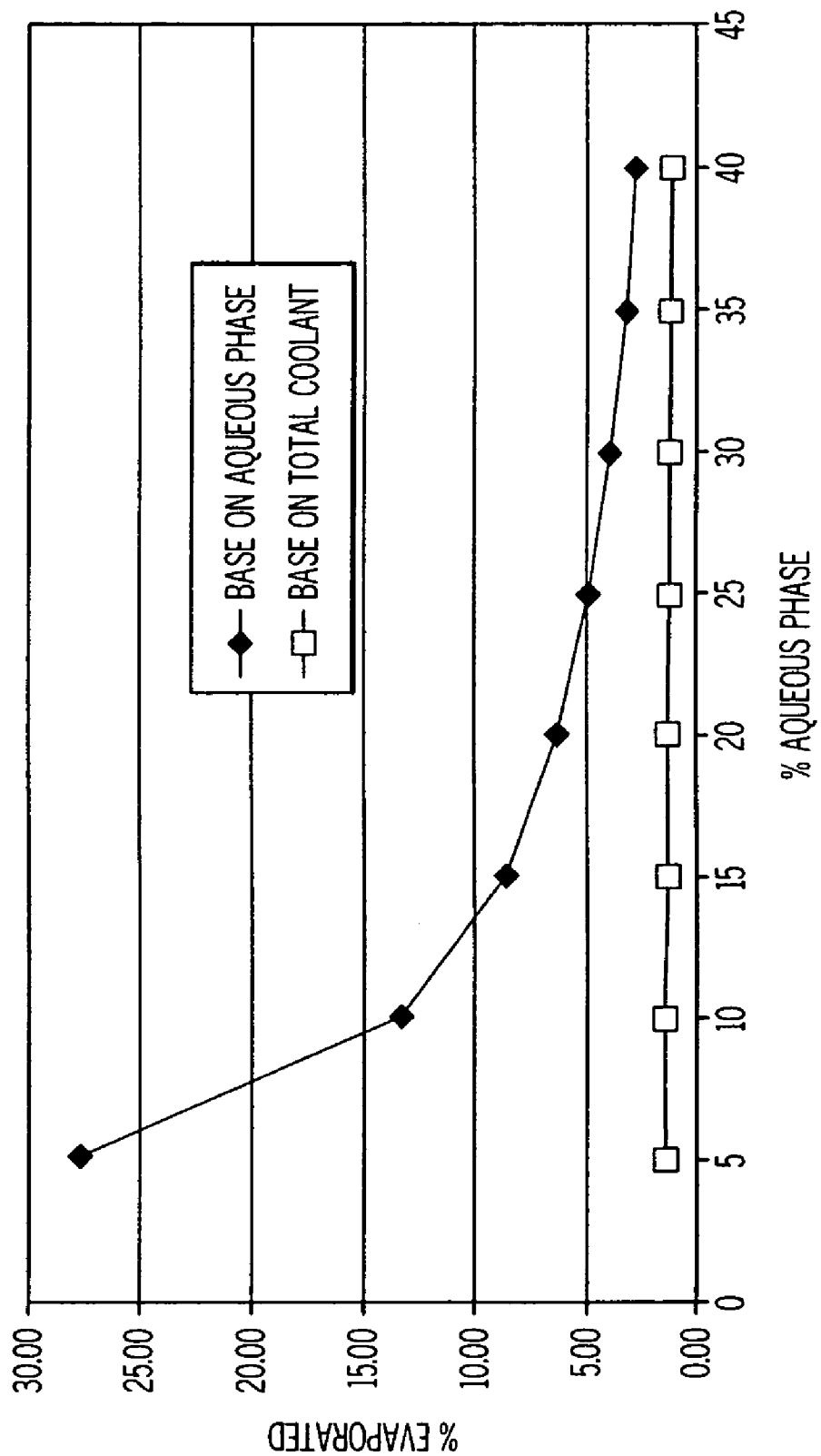
FIG. 4 is a plot of the percentage of the polar internal phase that is evaporated to affect cooling of a fuel cell in accordance with the present invention.

FIG. 4 illustrates that for a 20 v/o aqueous internal phase (32 water/68 2-butanol) in kerosene only 6 v/o and 1 v/o of the aqueous phase, based on the aqueous phase and total coolant concentration, respectively, needs to evaporate to produce water-like thermal loads. Equations 1 and 2 below were used to calculate the data presented in FIG. 4, where the "rule of mixtures" is used to calculate the Cp and latent heat of the aqueous phase and the coolant, the stack temperature drop (T out−T in) equals 10° C., and the mass flow rate of water and coolant are equal, wherein w=water, a=aqueous phase, c=coolant, and E=evaporation rate:

$$q_w = q_c;\ m_w C p_w \Delta T = m_c C p_c \Delta T + E_a \lambda_a \qquad (1)$$

$$E_a / m_w = \Delta T (C p_w - C p_c) / \lambda_a \qquad (2)$$

While the invention has been described by reference to certain embodiments, it should be understood that numerous changes could be made within the spirit and scope of the inventive concepts described. Accordingly, it is intended that the invention not be limited to the disclosed embodiments, but that is have the full scope permitted by the language of the following claims.

What is claimed is:

1. A fuel cell configured to react fuel with oxygen to generate an electric current and at least one reaction product, wherein:
   said fuel cell comprises an electrochemical catalytic reaction cell configured to include a fuel flowpath, an oxygen flowpath, and a coolant flowpath fluidly decoupled from said fuel flowpath and said oxygen flowpath; and
   said coolant flowpath defines a coolant isolation manifold, wherein said coolant isolation manifold includes a fluid dielectric coolant comprising an emulsion, said emulsion defining a polar internal phase and a hydrocarbon external phase, wherein
      said polar internal phase comprises an azeotropic mixture, and
      said azeotropic mixture includes a water component and an alcohol component.

2. The fuel cell of claim 1, wherein:
   said fuel flowpath comprises an anode flowpath configured to route said fuel through at least a portion of said fuel cell; and
   said oxygen flowpath comprises a cathode flowpath configured to route said oxygen through at least a portion of said fuel cell.

3. The fuel cell of claim 2, wherein said electrochemical catalytic reaction cell further comprises:
   an anode in fluid communication with said anode flowpath and upon which a catalytic reaction with said fuel is configured to take place;
   a cathode in fluid communication with said cathode flowpath and upon which a catalytic reaction with said oxygen is configured to take place; and
   a membrane disposed between said anode and said cathode such that electrolyte communication is established therebetween during operation of said fuel cell.

4. The fuel cell of claim 1, wherein
   said fuel cell further comprises a recirculation assembly, said recirculation assembly comprising a recirculation flowpath, a pump, and a radiator;
   said coolant isolation manifold further includes an inlet and an outlet; and
   said recirculation flowpath fluidly connects said coolant isolation manifold inlet and said coolant isolation manifold outlet.

5. The fuel cell of claim 1, further comprising a system, said system comprising a fuel cell stack comprising a plurality of said fuel cells.

6. The fuel cell of claim 5, wherein said system further comprises:
   a vehicle body, wherein said fuel cell stack is configured to at least partially provide said vehicle body with motive power.

7. A fuel cell configured to react fuel with oxygen to generate an electric current and at least one reaction product, wherein:
   said fuel cell comprises an electrochemical catalytic reaction cell configured to include a fuel flowpath, an oxygen flowpath, and a coolant flowpath fluidly decoupled from said fuel flowpath and said oxygen flowpath; and
   said coolant flowpath defines a coolant isolation manifold, wherein said coolant isolation manifold includes a fluid dielectric coolant comprising an emulsion, said emulsion defining a polar internal phase and a kerosenic hydrocarbon external phase, wherein
      said polar internal phase comprises an azeotropic mixture, and
      said azeotropic mixture includes a water component and an alcohol component.

* * * * *